Feb. 7, 1967 R. M. MESSAMER 3,302,900

TAPE TRANSPORT VACUUM CHAMBER

Filed Sept. 24, 1963 2 Sheets-Sheet 1

INVENTOR.
ROBERT M. MESSAMER

BY

Robert G. Clay

ATTORNEYS

TAPE TRANSPORT VACUUM CHAMBER

Filed Sept. 24, 1963 2 Sheets-Sheet 2

INVENTOR.
ROBERT M. MESSAMER
BY Robert G. Clay
ATTORNEYS

United States Patent Office 3,302,900
Patented Feb. 7, 1967

3,302,900

TAPE TRANSPORT VACUUM CHAMBER

Robert M. Messamer, Reseda, Calif., assignor to Ampex Corporation, Redwood City, Calif., a corporation of California Filed Sept. 24, 1963, Ser. No. 310,994
6 Claims. (Cl. 242—55.12)

This invention relates to tape transport systems employing vacuum chambers to provide a buffering tape loop between the tape driving mechanism and the storage reels, and more particularly to an improved vacuum chamber which simplifies initial threading while also protecting against tape breakage during operation.

Tape transport systems are presently employed in a number of different applications, including high performance digital magnetic tape systems operating in conjunction with modern high speed data processing equipment. These high performance magnetic tape transport systems, for example, are required to operate bidirectionally at high speeds to pass the magnetic tape in a precise path past magnetic recording and reproducing head assemblies for transfer of digital data to and from the magnetic recording surface of the tape. The tape transport system must be capable of starting, stopping or reversing the tape direction in extremely short periods of time in order to make most efficient use of the storage capacity of the tape and also to reduce to a minimum the access time needed to retrieve any selected data record on the tape.

The relatively large and bulky reels upon which the tape is wound, as well as the weight of the tape itself, necessarily introduce a high degree of inertia into the reel mechanisms usually employed with such systems. Accordingly, the supply and takeup reel mechanisms cannot ordinarily be supplied with sufficiently fast acceleration and deceleration characteristics, such as must be achieved in a high performance digital tape transport. Therefore, it has commonly been the practice to quickly accelerate and decelerate the tape in the vicinity of the magnetic recording and reproducing head assemblies by means of a separate tape drive mechanism, while providing low inertia tape lengths to act as a buffer or tape storage between the drive means and the slower acting tape reels. The tape sections in these buffering lengths thus provide intermediate storage to compensate for temporary speed differences between the slower acting, high inertia reels and the quick acting tape drive mechanism.

The buffering or compliance mechanisms used to form buffering lengths in modern tape transport systems are of several types. In one widely preferred form of buffering mechanism, a long length of tape is looped within a vacuum chamber to provide an extremely low inertia coupling length between the drive mechanism and each of the reels. In most instances, the vacuum chamber consists of an elongated enclosure with an open end through which the tape loop is formed with a vacuum source connected through an opening at or adjacent to the closed end of the chamber. With the atmospheric pressure communicating with one side of the tape through the open end and the lower pressure on the other side of the tape due to the vacuum source, a pressure differential is established which forces the tape down into the chamber to form the desired loop. The end of the loop may be held at a desired optimum point within the chamber between the open end and the closed end by means of loop sensing devices disposed at appropriate points within the chamber and coupled to a servo system which controls the associated reel motor.

While the use of such vacuum chamber buffering devices has proved highly advantageous to the operation of many types of tape transport systems, certain difficulties arise in the operation of these chambers. Each time the operation of the tape transport system is to be initiated with a new tape, it is first necessary to thread the tape in the desired tape path between the two reels. With most tape transport systems, this requires that the tape be threaded in a path directly over or in close proximity to the open end of the vacuum chamber. If the vacuum sources are turned on during this threading operation, the operator must exercise extreme caution to prevent the tape from being pulled from his grasp into the chamber. If that occurs, the end of the tape must then be retrieved from the chamber and the threading operation begun again. In addition, the operator may be required to clamp the end of the tape at the hub on the take-up reel at the completion of the threading operation. While doing this, the hands or fingers of the operator may be in a position between the spokes of the reel to be severely injured should the reel servo be actuated.

These threading difficulties are commonly avoided by cutting off the vacuum source or decoupling the source from the chamber during the threading operation while also cutting off power to the reel servos, although this technique itself presents additional problems. Without the vacuum to hold the tape within the chamber, it is necessary to provide retaining pins within the chamber around which the tape may be held until the vacuum is applied. In most cases, the tape is threaded by opening the front of the chamber and meticulously passing the tape in a path around the retaining pins. Thus, the threading operation is difficult and slow with existing vacuum chambers, and devices which may be employed to facilitate the threading operation require substantial additional expense.

Therefore, it is an object of this invention to provide an improved vacuum chamber to facilitate manual threading of the tape in a tape transport system.

Another object of this invention is to provide an improved tape transport system including vacuum chamber buffering devices within the tape path, which chambers facilitate manual threading of the tape while also providing increased operative safety.

A further object of this invention is to provide an improved low inertia compliance means for use as a buffering device in a tape transport system.

These and other objects are accomplished in accordance with the invention by providing a vacuum chamber constructed in such a manner that when the tape is placed across its open end, at least a partial pressure seal results. An inlet hole is provided in the cover of the chamber adjacent the open end so that the interior of the chamber is vented to the exterior atmospheric pressure. The cover inlet may then be selectively closed, as by simply covering the hole with a finger to seal the interior of the chamber off from the atmospheric pressure. A vacuum source coupled to the chamber at or near the closed end then establishes a substantial pressure differential across the length of tape which lies across and partially seals the open chamber end, and the tape is drawn into the chamber past the inlet hole to a desired intermediate position. The tape may then be maintained in this desired position by means of a servo system as a substantially constant pressure differential across the tape is sustained by the vacuum source. The inlet hole in the chamber cover need only momentarily be closed since the tape is quickly driven into the chamber past the position of the inlet hole near the open end.

The servo system used to maintain the tape loop in the desired optimum position within the vacuum chamber may take any of a number of conventional forms. The servo system may include a tape position sensing device, such as a pressure switch or optical sensing device for determining the length of the tape loop, and furnishing one control signal to the servo amplifier and motor which control the movement of the associated reel. However, until the tape is drawn into the chamber by closing the hole, the servo system should not be actuated. Therefore, in accordance with the invention, a pressure sensitive switch is disposed near the closed end of the chamber to sense the vacuum which results upon closing of the hole by the operator. When this switch is closed by the vacuum, electrical power is provided to operate the servo. Therefore, the servo mechanism for the reel is immediately supplied with power by the drop in pressure and remains powered as long the the pressure differential is maintained by the presence of the tape within the chamber.

In addition, the pressure switch used for actuating the servo also acts as a safety device both during threading and in the event that the tape is either drawn out of the chamber or drawn too far within the chamber by a malfunction of the transport system during operation. In both cases, the closed end of the chamber is subjected to the external atmospheric pressure and power to the servo system is cut off by the switch.

A better understanding of the present invention will be had by reference to the following detailed description and the accompanying drawings, in which.

Figure 1:
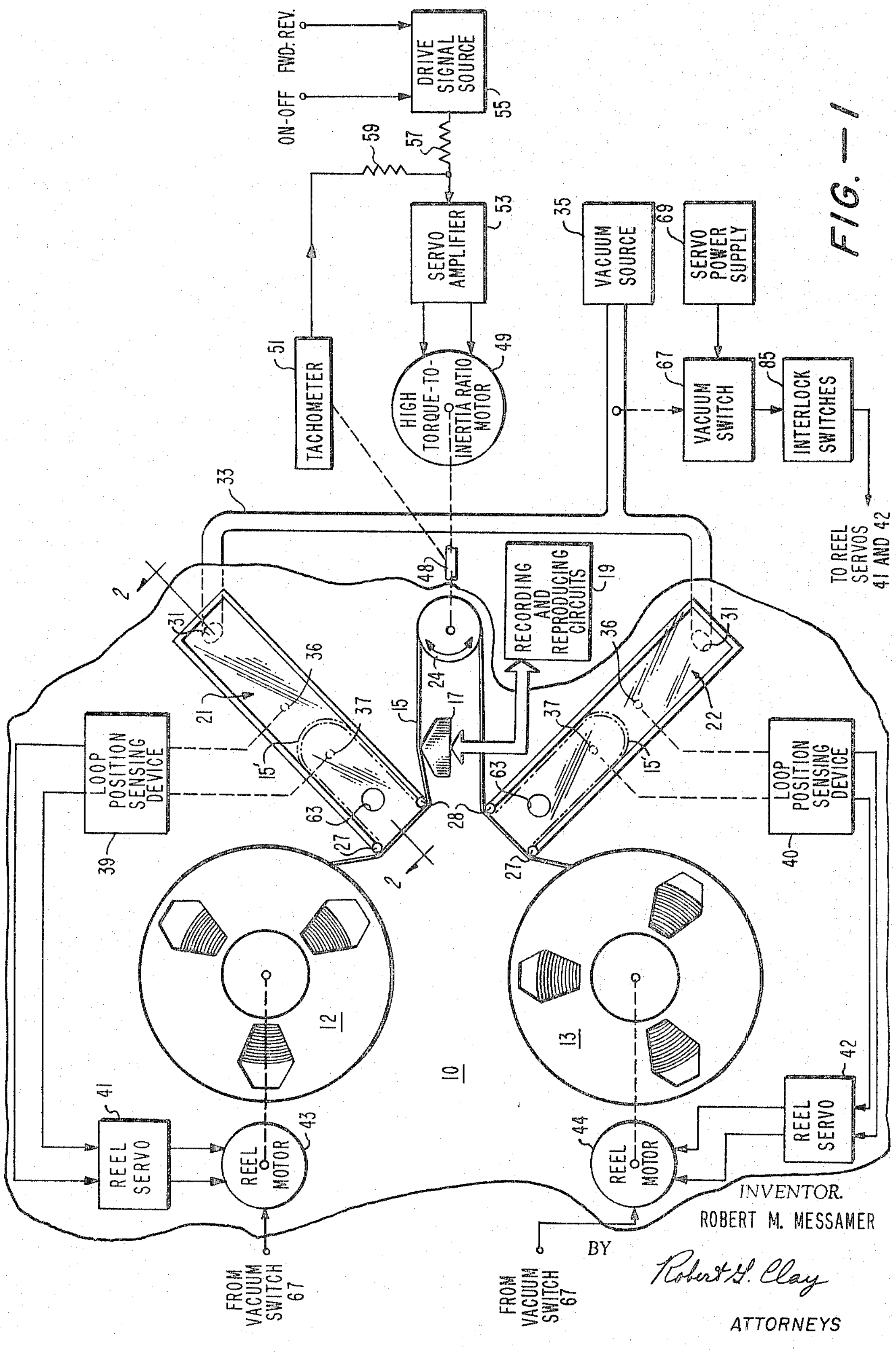
FIG. 1 is a simplified front view and block diagram representation of a preferred form of a tape transport system in accordance with the present invention.

A magnetic tape transport system having an improved vacuum chamber arrangement in accordance with the present invention is illustrated in FIG. 1 as to its general organization. Those details of such a system which are not concerned with particular aspects of the present invention have either been omitted or have been illustrated generally where possible in order to simplify the description, but their use will be understood by those skilled in the art.

The mechanical elements of the tape transport system are mounted on a front panel 10, and generally include a tape supply reel 12, and a tape takeup reel 13, the designations "supply" and "takeup" being used solely for convenience. In operation a magnetic tape 15 is moved bidirectionally between these reels in a low friction, relatively low tension tape path. Typically, the magnetic tape 15 is driven in a forward or reverse direction past a magnetic head assembly 17 coupled to recording and reproducing circuits 19 which are interconnected with an associated data processing system (not shown). The data processing system or some other related means provides forward or reverse, and off or on signals for controlling the tape transport mechanism. Inasmuch as the transfer of data and the provision of these control signals may be achieved by conventional means, no further explanation is provided herein.

The tape supply and takeup reels 12 and 13, a pair of improved vacuum chambers 21 and 22 in accordance with the invention, and a centrally disposed drive capstan 24 are arranged symmetrically in a compact configuration on the front panel 10. Each of the vacuum chambers 21 and 22 is positioned between the capstan 24 and a respective one of the reels 12 or 13 to effect mechanical decoupling and consant tensioning of the tape at the capstan from the high inertia reels. During operation the vacuum chambers provide a variable storage length of tape to accommodate the relatively slower reel response, while the tape in the vicinity of the capstan 24 may be quickly accelerated and decelerated. Generally, such vacuum chambers may have a tape receiving opening at the front end with a pair of tape guides 27 and 28 on either side of this opening. Each chamber also includes a vacuum port opening 31 located adjacent the closed end of each chamber and connected through appropriate pneumatic tubing 33 to a common vacuum source 35.

When the tape transport system has been placed in operation with tape loops formed in the vacuum chambers 21 and 22, the lengths of the tape loops are maintained within selected limits determined by the position of a pair of sensing ports 36 and 37. This is accomplished by a pair of loop position sensing devices 39 and 40, which may be, as illustrated herein, differential pressure switches coupled to each of two pressure sensing holes 36 and 37 in an associated chamber. Other loop sensors, including photoelectric devices, may be used instead of the pressure switches if desired. Each loop position sensing device 39 or 40 operates to provide an appropriate error signal to a coupled reel servo circuit 41 or 42, respectively, and operates therewith to maintain or return the length of the tape loop to a position between the two ports 36 and 37. The reel servos 41 and 42 each control the movement of a connected reel motor 43 or 44 respectively, so that the reels 12 and 13 are rotated to withdraw tape from, or to supply tape to, the chambers 21 and 22 and the capstan 24 during operation. This particular system for driving the reels 12 and 13 and many conventional modifications of this system, such as the use of other forms of loop sensing servo systems, are well known to those skilled in the art.

It should be understood that the operation of this particular type of tape transport system materially differs from that of other systems heretofore used inasmuch as there are no high tension forces, high friction forces, or high impact forces on the tape 15. The vacuum chambers 21 and 22 are employed to maintain substantially equal low tape tensions on opposite sides of the capstan. The only frictional forces during tape movement result from the contact of the tape 15 with the guides 27 and 28 at the entrance and exit ends of both chambers, with the walls of the chambers 21 and 22 and with the magnetic head assembly 17. On the other hand, the drive capstan 24 may have a highly frictional and partially resilient surface, such as a rubber-like surface, so that the tension on the tape 15 may be maintained at a relatively low value, such as 0.5 pound, by the vacuum chambers 21 and 22 while still maintaining the frictional contact needed for driving the tape in a non sliding relationship.

With this particular type of tape transport system, the absence of friction in the tape path during operation, along with the presence of low inertia compliance mechanisms, insures that the tape is driven solely by the action of the capstan 24. Also, because of the low tape tensions and the high wraparound angle, and because the tensions on both sides of the capstan are kept substantially equal, no high forces have to be overcome in turning the capstan 24 to move the tape 15. Because of these considerations, the inertia of the capstan 24 and its driving member are substantially an order of magnitude greater than the inertia and frictional forces in the tape path, thus permitting the movement of the capstan 24 to be determinative of the movement of the tape.

The capstan 24 may be directly coupled by a motor shaft 48 to a high torque-to-inertia ratio direct current type of motor 49 of the type containing a planar rotor with windings disposed as printed circuit conductors thereon. This type of motor is employed for this tape transport system because it not only has the necessary high torque-to-inertia ratio, but also has a substantially linear torque versus current characteristic over a relatively wide range, although a number of other high torque-to-inertia ratio motors are also suitable. Thus, when coupled to a mechanical system having a very low and substantially constant counter-torque, the magnitude and polarity of the applied current can be used to control accurately and completely the speed of operation of the mechanical system. However, it should be recognized that a linear characteristic in the motor is not necessary as long as the torque characteristic continues to increase with increasing power.

The motor 49 may be controlled by a servo system including a feedback tachometer 51, which is also directly coupled to the motor shaft 48 and the capstan 24 and a servo amplifier 53. Control signals for the servo system are derived from the drive signal source which receives the on-off and the forward-reverse signals from a data processing system or other source, and delivers a control signal having an amplitude and polarity indicative of the desired speed and direction of the motor 49. In operation, the control signals for the servo are applied through an input impedance, generally illustrated as a resistor 57, to the servo amplifier 53, whereas negative feedback signals from the tachometer 51 are coupled through a feedback impedance, generally illustrated as a resistor 59. It is also useful to provide a tape speed reference signal from the tachometer 51 to the reel servo 40, 41, although not shown here in detail.

While the operating components of the particular type of tape transport system illustrated herein have been generally described hereinabove, a more complete description of structure and operation may be found in a number of copending U.S. patent applications assigned to the assignee of the present invention, which applications include that of Robert A. Kleist entitled "Drive System for Tape Transport Systems," Serial No. 267,175 filed March 22, 1963 now Patent No. 3,185,364, Robert A. Kleist and Ben C. Wang entitled "Magnetic Tape Transport System," Serial No. 268,140 filed March 26, 1963, now Patent No. 3,251,563, and Martyn A. Lewis entitled "Motor Drive Circuit," Serial No. 267,166 filed March 22, 1963. While many of the aspects of this invention are generally applicable to many types of tape transport systems wherein vacuum chamber buffers are employed, certain advantages are particularly applicable to the illustrated system and will be pointed out hereinafter.

Figure 2:
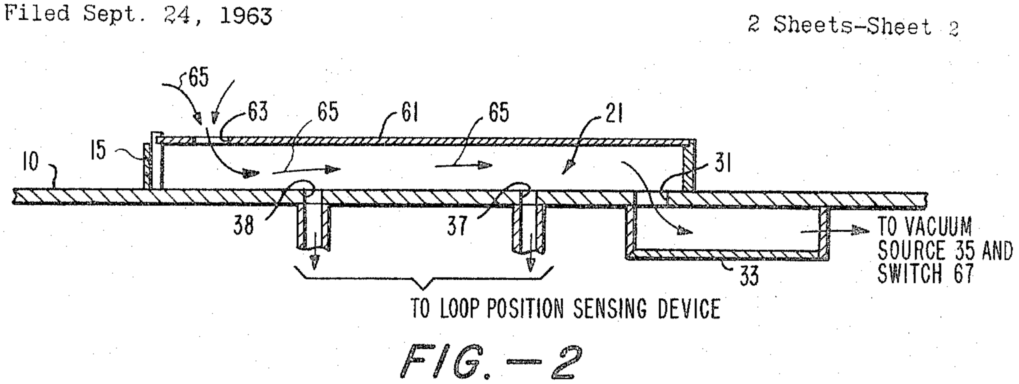
FIG. 2 is a side sectional view of a vacuum chamber constructed in accordance with the invention taken along the line 2—2 of the tape transport system of FIG. 1.

FIG. 2 is a sectional view of the vacuum chamber 21 illustrating certain details of a vacuum chamber constructed in accordance with the invention. The elongated chambers 21 and 22 consist of side walls mounted on the front plate 10 of the tape transport with a flat cover plate 61, which may be of a transparent plastic material and may be hinged with respect to one of the side walls to permit access to the interior of the chamber. An inlet hole 63, which may be selectively closed as by an operator placing a thumb over the opening, is provided in the cover 61 slightly apart from the tape receiving opening or entry end. The entry end of each of the chambers is arranged in the tape path so that when the tape 15 is passed from the reels around the capstan 24, a portion of the tape lies across the entry end of the chamber to form a substantial pressure seal at that point.

The operation of threading the tape 15 from the supply reel 12 around the capstan 24 to the takeup reel is first accomplished with the hole 63 in the front cover of the chamber left open. During this initial threading operation, the vacuum source 35 may either be left on or turned off as desired. However, at such time as the vacuum source 35 is on, the tape 15 is not immediately snapped into the chambers because no substantial pressure differential exists across the tape section at the tape receiving opening with the inlet holes 63 open. The inlet holes 63 permit the interior of the chambers 21 and 22 to communicate directly with the atmospheric external pressure through the chamber cover. As shown in FIG. 2 by the arrows 65, the vacuum source 35 merely draws air into the chamber 21 through the open port 63 and thence to the vacuum port 31 at the back end of the chamber. This air flow continues through the pneumatic tubing 33 without a substantial drop in pressure at the inlet to the vacuum source 35. A vacuum switch 67, which is coupled through a sensing port in the tubing 33 at the inlet to the vacuum source 35, is thus maintained open to interrupt the flow of current from the servo power supply 69 to the reel motors 43 and 44. Therefore, during the period that the tape 15 is being threaded, the reels 12 and 13 are prevented from operating under control of the reel servos 40 and 41 until a vacuum is sensed by the switch 67, as would be produced by covering both the holes 63 to draw the tape into the chambers.

When the tape has been threaded to place it over the entry ends of each of the chambers 21 and 22 and the servo power supply 69 is on, the tape transport system is in a standby condition. The operator may then cover both the holes 63 manually, simply by placing his thumbs over the openings, which immediately creates a vacuum within the chamber and at the inlet to the vacuum source 35. The vacuum in the chamber 21 or 22 establishes a pressure differential across the tape at the tape receiving opening, and the tape is driven into the chamber past the holes 63 in the chamber cover. At the same time, the vacuum switch 67 is closed to provide operating power to the reel motors 43 and 44 which rotate under the control of the associated reel servo 40 or 41 to provide additional tape to form the loops within the chambers. The reels 12 and 13 continue to turn in the appropriate direction until the tape loop assumes a position as shown by the dotted line 15′ between the two loop position sensing ports 36 and 37. As the tape passes the first sensing port 37 in each chamber that port is subjected to atmospheric pressure, thus turning off the associated reel motor to hold the tape loop in the correct operating position between the two sensing ports 36 and 37. As known to those skilled in the art, this signal may be combined with a tape speed input signal or used directly as a limit indication for control of the servo.

Figure 3:
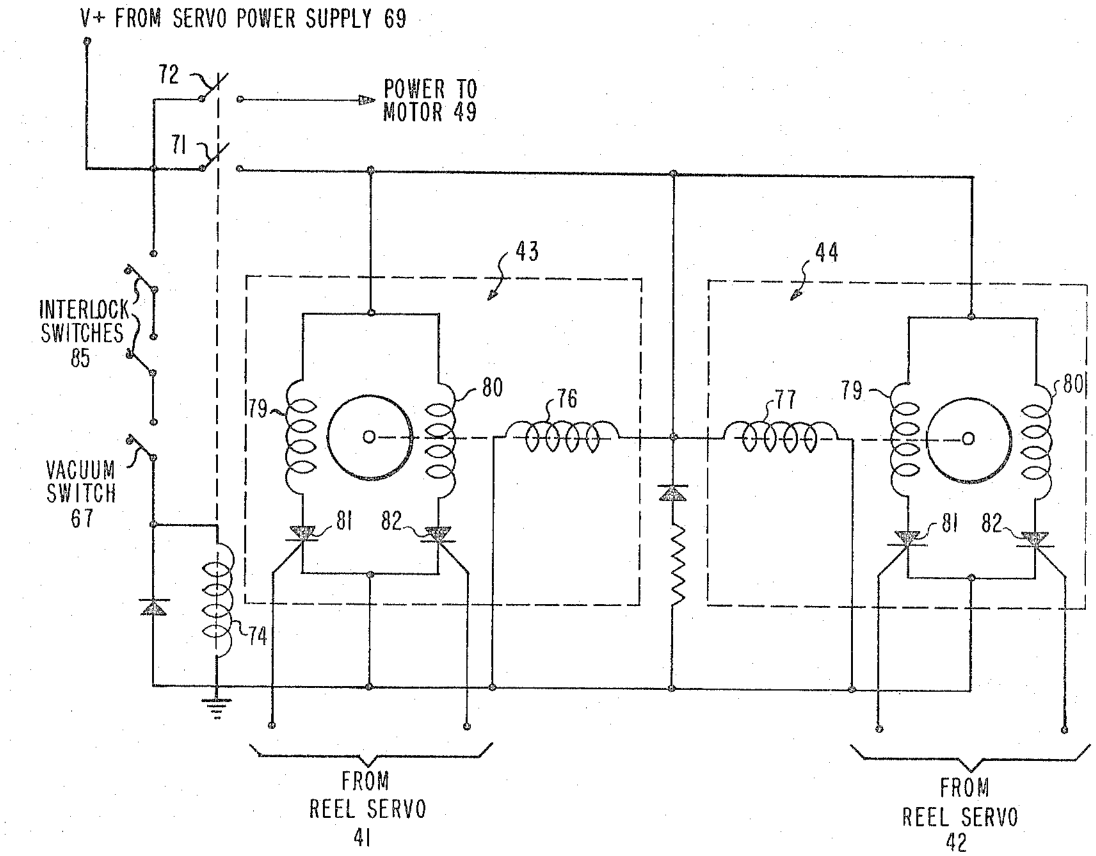
FIG. 3 is a simplified circuit diagram illustrating features of a reel servo system in accordance with the invention.

FIG. 3 illustrates a simplified circuit arrangement for accomplishing the above described series of steps in going from a standby to an operating mode. A V+ voltage from the servo power supply 69 is supplied through a pair of normally open switches 71 and 72, which are actuated by the single solenoid coil 74, to the windings of the reel motors 43 and 44 and the solenoid coils 76 and 77 of the reel motor brakes and to the capstan motor 49, respectively. The reel brakes (not shown in detail herein) may be of the type having a friction element urged by a spring or magnetic action against the shaft of the associated motor whenever the respective solenoid coil is not actuated. Actuation of the solenoid coil, however, withdraws the friction element from braking contact with the motor shaft thereby permitting free rotation to occur. Each of the reel motors, as illustrated in FIG. 3, may have forward and reverse stator coils 79 and 80, each receiving current through an associated silicon controlled rectifier 81 or 82. The silicon controlled rectifier 81 or 82 on both of the reel motors 43 and 44 are actuated by appropriate signals from the respective reel servo 41 or 42, which signals are applied to the control electrode to allow current flow through one of the associated windings 79 or 80.

The vacuum switch 67 may be connected in series with other interlock switches 85 between the V+ source and the actuating coils 74 of the solenoid used to close the normally open switches 71 and 72. The other interlock switches 85 may be used for other elements in the system and are closed when the system is in proper condition for the beginning of operations; for example, the interlock switches are included in many systems to be closed after the hinged cover 61 for the vacuum chambers is in place. With these other interlock switches 85 closed, the vacuum switch 67 then closes upon creation of the vacuum at the inlet to the vacuum source 35 to provide current from the V+ source, which passes through the solenoid coil 74 to close the normally open switches 71 and 72. The current through the switch 72 may then actuate the solenoid coils 76 and 77 of the braking mechanism to release the brake on the reel motors 43 and 44. The V+ supply is also made available through the switch 71 to the forward and reverse windings 79 and 80 of the reel motors 43 and 44 to permit rotation of the reels 12 and 13 in accordance with the signals received from their associated servo systems.

It should be noted that not only does a vacuum chamber arrangement in accordance with the invention greatly facilitate the initial threading of the tape in a tape transport system, but also provides a simplified failure sensing system for the vacuum chambers during operation. Briefly, a malfunction of the system during operation may cause the tape loop to be drawn too far into or too far out of one of the chambers, at which point it is desirable to suspend further operation of the system until the malfunction can be corrected. Previously, this was accomplished by providing separate limit sensing ports within the vacuum chambers adjacent either end to sense excessively long or excessively short loops and subsequently to disable the capstan drive and servo systems to protect against excessive tape stress. However, vacuum chamber arrangements in accordance with the present invention obviate the need for separate limit sensing ports within the chamber.

When the loop is too short in either chamber it will pass the opening 63 to allow atmospheric pressure to enter the chamber and raise the pressure at the vacuum switch 67. Too long a loop will likewise pass a portion of the vacuum port 31 to allow atmospheric pressure to open the vacuum switch 67 and disable the servos. Therefore, the desired limit sensing is accomplished by the provision of the cover opening 63 and a single vacuum switch 67 coupled to the inlet of the vacuum source 35.

Also, as was previously described in the general description of the illustrated type of tape transport system, the tape 15 is maintained in non-slip engagement with the capstan 24 by virtue of the tensioning forces in the tape path which are exerted by the vacuum chambers 21 and 22. This tension is maintained relatively small in magnitude, but nevertheless must exist to maintain the desired frictional forces between the tape surface and the surface of the capstan 24. Accordingly, it should be noted that, if the tape is suddenly drawn out of the chamber, as a result of a malfunction, the tension on the tape path is immediately released as soon as the tape loop passes the cover opening 63, inasmuch as there is no longer any pressure differential across the tape. The tape 15 therefore slips relative to the surface of the capstan 24 and prevents any possibility of tape breakage due to tape stress at the capstan.

While this invention has been described with relation to a particular type of tape transport system with vacuum chambers of a particular configuration, it should be understood that many of the aspects of this invention are generally applicable to other types of tape transport systems and diverse types of vacuum chambers. In each case, however, the vacuum chamber should be constructed to provide a substantial pressure seal when the tape is placed over the tape receiving opening, and the cover opening should be located near the tape receiving opening of the chamber in a position where it can be conveniently closed by the operator to initiate operation.

Also, it should be understood that various changes in the details, which have been herein described and illustrated in order to explain the nature of the invention, may be made by those skilled in the art within the principle and scope of the invention as expressed in the appended claims.

What is claimed:

1. In a tape transport system wherein low inertia tape loops are formed in the tape path between the tape storage means and the tape driving means, an improved vacuum chamber buffer comprising an elongated enclosure having a closed end and an open entry end for receiving a tape loop, a vacuum source coupled to said enclosure through a first opening at the closed end of the chamber, one of the walls of the chamber substantially parallel to the plane of the tape loop defining a second opening adjacent the entry end of the chamber, said second opening being open to atmospheric pressure and adapted to be selectively closed, tape loop sensing means for detecting desired tape loop lengths between said first and second openings, and means for disposing a length of tape to form a substantial pressure seal across said entry end so that momentary closure of said second opening establishes a vacuum within said enclosure to pull the tape into said chamber to form a loop of the desired length.

2. A vacuum chamber system for readily threading a magnetic tape and fail-safe operation for excessively short and excessively long loop lengths within the chamber, comprising: vacuum chamber means having an open entry end and an opposite closed end, and an elongated interior chamber therebetween for receiving the magnetic tape, the interior chamber providing a substantial pressure seal across tape loops therein, means coupled into the interior chamber adjacent the closed end for tending to maintain a vacuum therein, means defining an aperture adjacent the entry end of the vacuum chamber means and substantially parallel to the plane of the tape loop, for normally opening the entry end of the chamber to ambient pressure, servo drive means, responsive to loop lengths within the chamber which are intermediate said aperture and said means for maintaining a vacuum, for controlling loop lengths in normal operation, and means coupled to said means for maintaining a vacuum for disabling said servo drive means.

3. A vacuum chamber system for readily threading a magnetic tape into a loop within the chamber, and for fail-safe operation for improper loop lengths, comprising: a tape vacuum chamber having an elongated interior within which tape loops register with a substantial vacuum seal between an entry end and a closed end, vacuum source means including a vacuum inlet adjacent the closed end of the chamber, means defining a closable ambient inlet adjacent the entry end, said ambient inlet being substantially parallel to the plane of the tape loop and normally open to the atmosphere, servo drive means coupled to the tape for maintaining controlled length tape loops between the ambient inlet and the vacuum inlet, and pressure sensitive means positioned at the vacuum inlet for disabling the servo drive means when the vacuum inlet is coupled to ambient pressure.

4. In a tape transport system wherein the tape is driven between supply and takeup tape storage means by a capstan driving means in non-slip engagement with the tape, and wherein the non-slip engagement is maintained by the tension applied to the tape by the operation of a vacuum chamber, an improved vacuum chamber arrangement comprising an elongated vacuum chamber enclosure having a closed end and an open end for receiving a tape loop, a vacuum source coupled to said enclosure through a first opening at the closed end of the chamber, said chamber also defining a second opening adjacent the open end which is open to a pressure higher than vacuum and sufficiently small to be manually covered, servo means including a loop sensing device for maintaining the tape loop at a selected region between said first and second openings in the chamber, and means for controlling said servo means between actuated and disabled positions, whereby when said opening is selectively closed to form a tape loop within the chamber said switch means actuates said servo means and whereby, when said tape loop is pulled out of the chamber past said second opening, said control means disables said servo means and the tape tension is reduced below the level needed to maintain non-slip relation for said capstan drive means.

5. In a tape transport system wherein the tape is driven between supply and takeup tape storage means by a capstan driving means in non-slip engagement with the tape, and wherein the non-slip engagement is maintained by the tension applied to the tape by the operation of a vacuum chamber, an improved vacuum chamber arrangement comprising an elongated vacuum chamber enclosure having a closed end and an open end for receiving a tape loop, the interior cross-section of the chamber providing a substantial pressure seal across tape loops therein, a vacuum source coupled to said enclosure through a first opening at the closed end of the chamber, said chamber also defining a second opening adjacent the open end which is open to atmospheric pressure and sufficiently small to be manually covered, servo means including a pair of loop sensing devices at intermediate positions within the enclosure for maintaining the tape loop at a selected region between said first and second openings in the chamber, and pressure sensitive switch means positioned at said first opening for sensing increased pressure levels thereat, said switch means being coupled to control said servo means between actuated and disabled positions, whereby when said second opening is selectively closed to form a tape loop within the chamber said switch means actuates said servo means and whereby, when said tape loop is pulled out of the chamber past said second opening, said switch means disables said servo means and the tape tension is reduced below the level needed to maintain non-slip relation for said capstan drive means.

6. In a tape transport system having tape storage means and a tape driving means, a buffer system comprising a vacuum chamber having a closed end and an open end for receiving a tape loop, means defining a tape path for disposing a length of tape across the open end of said chamber to form a pressure differential across the tape, means defining a first opening adjacent the closed end of the chamber, a vacuum source coupled to the chamber through the first opening, means defining a second opening in one of the walls of the vacuum chamber substantially parallel to the plane of the tape loop and adjacent the open end of the chamber, servo means including a tape loop sensing device within the chamber for operating the tape storage means to maintain the tape in a selected region between said first and second openings and means for sensing the existence of a substantial vacuum at said first opening and coupled to actuate said servo means.

References Cited by the Examiner

UNITED STATES PATENTS

| | | | |
|---|---|---|---|
| 2,862,675 | 12/1958 | MacDonald ------- | 242—55.12 |
| 3,091,408 | 5/1963 | Schoeneman ------- | 226—97 X |
| 3,112,473 | 11/1963 | Wicklund et al. ---- | 340—174.1 |

FRANK J. COHEN, *Primary Examiner.*

GEORGE F. MAUTZ, *Examiner.*